May 13, 1969  N. A. SCHOLTUS  3,443,885
DEVICE FOR PASTEURIZING SOIL
Filed March 28, 1966
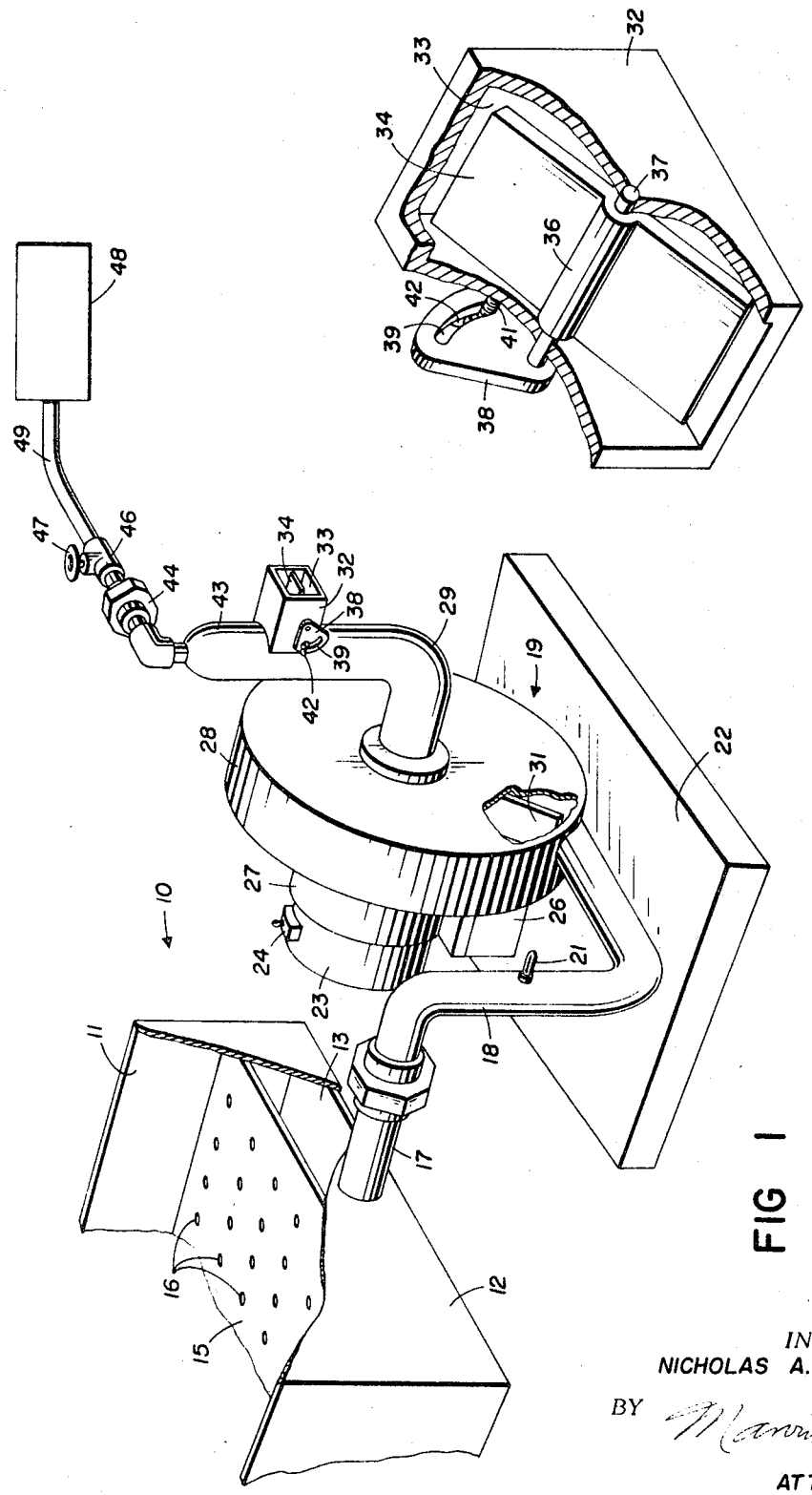
INVENTOR.
NICHOLAS A. SCHOLTUS
BY
ATTORNEY United States Patent Office 3,443,885
Patented May 13, 1969

3,443,885
DEVICE FOR PASTEURIZING SOIL
Nicholas A. Scholtus, 127 Patricia Lane NW.,
Cedar Rapids, Iowa 52405
Filed Mar. 28, 1966, Ser. No. 537,739
Int. Cl. A61l 3/00
U.S. Cl. 21—94                                             8 Claims

ABSTRACT OF THE DISCLOSURE

Apparatus for pasteurizing soil and then rapidly cooling it comprising a container with a false bottom into which soil to be pasteurized is placed and with a mixture of steam and air supplied to the space between the false bottom and the bottom of the container through a conduit that has a temperature sensing means. An impeller receives steam and air and the temperature into the pasteurizer is controlled so as to be about 155° F. to kill harmful substances while not injuring the desirable substances. After the temperature of the soil has reached 155° F. the steam input to the impeller may be turned off and the soil cooled by passing cool air from the impeller up through the soil. Thus, the soil may be very quickly pasteurized and cooled to allow rapid processing.

This invention relates in general to a pasteurizer and in particular to a device for pasteurizing soil for use by florists.

Many plants are raised and sold by florists in flower pots. One of the major problems in raising plants is disease which can cause loss of the entire plant. Florists have previously tried to eliminate disease by sterilizing the potting soil to kill all viruses and germs. However, it has been discovered that sterilized soil does not reduce disease in that when diseases get started in it, there are no agents for combating the disease.

It is an object of the present invention, therefore, to provide a pasteurizer for potting soil which allows certain agents in the soil to remain active enough to effectively combat diseases.

Another object is to provide a pasteurizer for soil which has an accurately controllable regulator to control the temperature.

Yet another object of this invention is to provide a blower with a controllable mixer that allows accurate control of the temperature.

A feature of this invention is found in the provision for a blower with a mixing chamber that allows a carefully regulated temperature to be maintained in the output which is supplied to a holder to pasteurize soil.

Further features, objects, and advantages will become apparent from the following description and claims when read in view of the drawings, in which:

FIGURE 1 illustrates the pasteurizer of this invention, and;

FIGURE 2 shows the damper control.

FIGURE 1 illustrates a container designated generally as 10 which has sides 11 and 12 and a bottom 13. A false bottom 15 is formed in the container and has openings 16. A pipe 17 opens into the space between false bottom 15 and bottom 13 to supply gas thereto.

A feeder pipe 18 connects to pipe 17 and has a thermometer 21 mounted in it to indicate the temperature of gas passing through the pipe. A blower 19 has a housing 28 to which pipe 18 is connected. An impeller 31 is mounted in the housing 28. A base 22 has a stand 26 which has a bracket 27 that holds motor 23. An on-off switch 24 controls motor 23. The output shaft of motor 23 is connected to impeller 31.

An inlet manifold 29 is connected to housing 28 and has an air inlet 32 connected to it. A steam generator 48 is connected to a pipe 49 that connects to a valve 46 with a handle 47. The valve 46 is connected to the upper end 43 of inlet manifold 29 through a trap 44.

A damper 34 is mounted in air inlet 32 as shown in FIGURE 2. Damper 34 has a center portion 36 which is attached to shaft 37. A sector 38 is attached to shaft 37 and is formed with a slot 39 through which a shaft 41 extends. The shaft 41 is attached to the wall of inlet 32 and carries a thumb screw 42 that locks the damper 34 in a selected position. The damper 34 controls the amount of air which passes opening 33 of the inlet into the manifold 29 and blower 19.

Since the steam is at a temperature of 212 degrees Fahrenheit, the air reduces this to the desired temperature.

In operation, soil to be pasteurized is placed in the container 10 and the valve 46 is opened to allow steam from generator 48 to pass into the manifold 29. The switch 24 is closed to start motor 23 which drives impeller 31. This draws air in through air inlet 32 which is mixed with the steam in the manifold 29 and the mixture is passed through pipes 18 and 17 into the container 10. The mixture passes through openings 16 of bottom 15 and up through the soil to pasteurize it.

The damper 34 is set to allow the amount of air to enter the manifold 29 to produce the desired temperature of the mixture to the soil. A temperature of 155 degrees Fahrenheit has been found to provide proper pasteurization of the soil. After the soil has reached a temperature of 155 degrees, the valve 46 may be closed and the impeller draws air through inlet 32 and forces it through the soil to cool it. Thus, within 30 minutes the soil is cooled sufficiently to allow it to be worked by hand.

It is seen that this invention provides a new and novel system for pasteurizing soil and although it has been described with respect to a preferred embodiment it should not be so limited as changes and modifications may be made which are within the full intended scope as defined by the appended claims.

I claim:

1. Apparatus for pasteurizing material comprising a container for the material, a conduit connected to the container, a blower connected to the conduit, a driving means connected to the blower, a mixing chamber connected to the input of the blower, a steam source connected to mixing chamber, and an air inlet connected to the mixing chamber to allow a mixture of air and steam at a temperature of about 155 to less than 212 degrees Fahrenheit to be supplied by the blower to the container to pasteurize material in the container and a temperature sensor mounted so as to sense the temperature of the mixture of air and steam so that the temperautre of the mixture can be controlled.

2. In apparatus according to claim 1 a valve connected between the mixing chamber and the steam source to control the flow of steam into the mixing chamber.

3. In apparatus according to claim 1 wherein the container has four sidewalls and a first bottom and a second false bottom mounted in the container above the first bottom and formed with a plurality of openings.

4. In apparatus according to claim 3 wherein the conduit is connected to the container so that it communicates with the space between the first bottom and the false bottom.

5. In apparatus according to claim 1 the air inlet comprising a passage connected to the mixing chamber, and an adjustable damper mounted in the passage to regulate the flow of air into the mixing chamber.

6. In apparatus according to claim 5 wherein the adjustable damper is pivotally mounted on a shaft which extends through the air inlet.

7. In apparatus according to claim 6 means for adjustably locking the shaft to the air inlet to a predetermined position.

8. In apparatus according to claim 7 wherein said locking means comprises a segment attached to the shaft which supports the damper and said segment is formed with a slot through which a threaded shaft extends, the threaded shaft connected to the air inlet, and a thumb nut receivable on the threaded shaft to lock the segment to a chosen angular position.

References Cited

UNITED STATES PATENTS

| | | | |
|---|---|---|---|
| 2,868,616 | 1/1959 | Poitras | 21—56 |
| 3,093,449 | 6/1963 | Kotarski | 21—94 |

FOREIGN PATENTS

| | | |
|---|---|---|
| 168,710 | 9/1921 | Great Britain. |
| 693,518 | 7/1953 | Great Britain. |
| 885,365 | 12/1961 | Great Britain. |

OTHER REFERENCES

Webster's Seventh New Collegiate Dictionary, p. 505, G. and C. Merriam Co., Springfield, Mass. (1965), (based on Webster's Third New International Dictionary, copyright 1961).

MORRIS O. WOLK, *Primary Examiner.*

S. MARANTZ, *Assistant Examiner.*

U.S. Cl. X.R.

43—130; 47—1.42; 134—56, 98